US 9,013,146 B2

(12) United States Patent
Suzuki et al.

(10) Patent No.: US 9,013,146 B2
(45) Date of Patent: Apr. 21, 2015

(54) SECONDARY BATTERY PACK

(75) Inventors: Shin Suzuki, Sagamihara (JP); Hiroaki Ueno, Sagamihara (JP)

(73) Assignee: NEC Energy Devices, Ltd., Kanagawa (JP)

( * ) Notice: Subject to any disclaimer, the term of this patent is extended or adjusted under 35 U.S.C. 154(b) by 367 days.

(21) Appl. No.: 13/262,761

(22) PCT Filed: Jun. 29, 2009

(86) PCT No.: PCT/JP2009/061860
§ 371 (c)(1),
(2), (4) Date: Oct. 3, 2011

(87) PCT Pub. No.: WO2011/001491
PCT Pub. Date: Jan. 6, 2011

(65) Prior Publication Data
US 2012/0025770 A1 Feb. 2, 2012

(51) Int. Cl.
*H02J 7/00* (2006.01)
*H01M 10/42* (2006.01)
*H01M 10/0525* (2010.01)

(52) U.S. Cl.
CPC ...... *H01M 10/4207* (2013.01); *H01M 10/0525* (2013.01); *H02J 7/0021* (2013.01); *H02J 7/0026* (2013.01)

(58) Field of Classification Search
USPC .......................................... 320/118, 134, 136
See application file for complete search history.

(56) References Cited

U.S. PATENT DOCUMENTS

| 6,891,352 | B2 * | 5/2005 | Miyazaki et al. | 320/118 |
| 8,319,476 | B2 * | 11/2012 | Sakurai et al. | 320/118 |
| 2003/0044689 | A1 | 3/2003 | Miyazaki et al. | |

(Continued)

FOREIGN PATENT DOCUMENTS

| CN | 101442211 A | 5/2009 |
| GB | 2453207 A * | 4/2009 |

(Continued)

OTHER PUBLICATIONS

Japanese Office Action issued May 30, 2012, in corresponding Application No. 2007-339230.

(Continued)

*Primary Examiner* — Yalkew Fantu
*Assistant Examiner* — David V Henze-Gongola
(74) *Attorney, Agent, or Firm* — Sughrue Mion, PLLC

(57) ABSTRACT

A secondary battery pack of the present invention includes a secondary battery block 3 in which a plurality of unit blocks 2 are connected in series; battery adjustment sections 5 that are each provided for each of the unit blocks 2 and have a function of monitoring the voltage of secondary batteries and a function of adjusting the balance; a charge switch 8; and a discharge switch 9. The secondary battery pack includes transmission sections 17 that receive information from the corresponding battery adjustment sections 5. The transmission sections are connected to the preceding or subsequent transmission sections and are so set that at least either information input from the preceding transmission sections or information input from the battery adjustment sections 5 is output to the subsequent transmission sections. The transmission sections are equipped with a constant current transmission section that transmits with a constant value of current; and a current detection section that can detect the value of the constant current.

5 Claims, 4 Drawing Sheets

(56) References Cited

U.S. PATENT DOCUMENTS

| | | | |
|---|---|---|---|
| 2004/0178768 A1 | 9/2004 | Miyazaki et al. | |
| 2005/0242667 A1 | 11/2005 | Emori et al. | |
| 2009/0130541 A1 | 5/2009 | Emori et al. | |
| 2012/0177954 A1* | 7/2012 | Houldsworth et al. | 429/7 |

FOREIGN PATENT DOCUMENTS

| | | | |
|---|---|---|---|
| JP | 2002110259 A | 4/2002 | |
| JP | 2002-152982 A | 5/2002 | |
| JP | 2003-070179 A | 3/2003 | |
| JP | 2005318736 A | 11/2005 | |
| JP | 2007218680 A | 8/2007 | |
| JP | 2008-043009 A | 2/2008 | |
| JP | 2009-089486 A | 4/2009 | |
| JP | 2009-100644 A | 5/2009 | |
| WO | 2009008314 A1 | 1/2009 | |

OTHER PUBLICATIONS

Communication dated May 6, 2014 from the State Intellectual Property Office, P.R. China in counterpart Chinese Patent Application No. 200980160149.3.

Search Report dated Nov. 28, 2013 issued by the European Patent Office in counterpart European Patent Application No. 09846784.8.

Communication dated Jan. 6, 2015, issued by the State Intellectual Property Office of the People's Republic of China in counterpart Application No. 200980160149.3.

\* cited by examiner

SECONDARY BATTERY PACK

CROSS REFERENCE TO RELATED APPLICATIONS

This application is a National Stage of International Application No. PCT/JP2009/061860 filed Dec. 29, 2011, the contents of all of which are incorporated herein by reference in their entirety.

TECHNICAL FIELD

The present invention relates to a secondary battery pack and particularly to a secondary battery pack that is equipped with a secondary battery block including a plurality of secondary batteries connected in series and a control circuit that monitors battery voltage, controls charge and discharge, and performs other processes.

BACKGROUND ART

The use of secondary batteries such as lithium-ion batteries has become widespread in recent years into such fields as electrically-powered equipment and storage of electricity. Demand for a number of batteries connected in series is increasing in order to address the issue of high voltage. At the same time, there is a great demand for securing long-term reliability and safety and improving battery longevity. When a battery back is formed by connecting a plurality of single batteries in series, it is ideally desirable in terms of reliability, safety and longevity that the voltages through the constituent batteries remain uniform in charge and discharge operations and in storage operation and the constituent batteries deteriorate in performance at the same rate until the life of all the constituent batteries comes to an end. However, in reality, the constituent batteries vary in performance, deterioration speed and the like. Therefore, the balance of voltage can be lost. In order to address the problem, the following measure is taken as disclosed in Patent Document 1: the voltage of the constituent batteries is monitored in general to provide protection against troubles such as an overcharge during charging, control the voltage balance, and perform other processes. Normally, in order to form a secondary battery block by connecting a number of batteries in series, a secondary battery is divided into unit blocks for every several batteries and a battery adjustment section is provided for each. Furthermore, the information from the battery adjustment sections is transmitted to a control circuit to control a charge and discharge switch and the like in order to control the secondary battery pack.
Patent Document 1: JP-A-2002-152982

DISCLOSURE OF THE INVENTION

Problems to be Solved by the Invention

However, when a circuit that transmits information from the battery adjustment sections is provided for each unit block, the potential differences between unit blocks increase. Therefore, in the system that transmits signals to the control circuit, high voltage may be applied. Therefore, high voltage-withstanding components are required for circuit components or detection elements connected to the system. Or alternatively, particular kinds of insulation are necessary for the signal transmission system.

FIG. 3 is a circuit diagram illustrating an example of a battery back in which a secondary battery block is formed by connecting a number of the above batteries in series, with an insulation measure being put in place. As shown in FIG. 3, the secondary battery block 3 is formed by connecting unit blocks 2, each of which includes several secondary batteries 1, in series. Each of the unit blocks 2 has a battery adjustment section 25. The battery adjustment section 25 has a function of monitoring the voltage of the secondary battery 1 and a function of adjusting the balance of voltage between the secondary batteries 1. Several unit blocks 2 are collectively regarded as a combined block 4. There is a slave control section 12 that monitors the voltage of the unit blocks 2 and adjusts the balance of voltage therebetween for each of the combined blocks 4. A master control section 14 takes control of the slave control section and a charge switch 8 and discharge switch 9 that are inserted into a charge and discharge path on the basis of information from the slave control sections 12 of the combined blocks and information from a current detection section 6 that is inserted into the charge and discharge path of the secondary battery block 3. Incidentally, a temperature detection section 10 is provided to monitor the temperature of the secondary battery block 3, and an output from the temperature detection section 10 is input to the master control section.

In the case of FIG. 3, detail information about the value of voltage output from the slave control section 12 and the like is converted into digital signals which are then transmitted by a signal transmission means such as photocouplers and wireless communication units to an insulated communication section 15 that is provided so as to be insulated from each slave control section. The information is transmitted from the insulated communication section 15 to the master control section 14.

FIG. 4 is a circuit diagram illustrating an example of the configuration of a secondary battery back, a simplified version of that illustrated in FIG. 3. In FIG. 4, in a similar way to those shown in FIG. 3, the secondary battery block 3 is formed by connecting unit blocks 2, each of which includes several secondary batteries 1, in series. Each of the unit blocks 2 has a battery adjustment section 35. The battery adjustment section 35 has a function of monitoring the voltage of the secondary battery 1 and a function of adjusting the balance of voltage between the secondary batteries 1. Moreover, the secondary battery pack includes a current detection section 6 that monitors the charge and discharge current of the secondary battery block 3; and a control section 24 that takes control of the battery adjustment sections 35 on the basis of information from the battery adjustment section 35 and the current detection section 6. Moreover, the secondary battery pack includes a temperature detection section 10 that monitors the temperature of the secondary battery block 3; and a charge switch 8 and discharge switch 9 that are used to connect and break the charge and discharge path under the control of the control section 24.

In the secondary battery pack illustrated in FIG. 4, information from the battery adjustment sections 35 is transmitted to the control section 24 via transmission sections 27 that are equipped with either a high voltage-withstanding level conversion circuit or an insulated communication means such as photocouplers. Incidentally, since the reference electric potential at the battery adjustment section 39 placed in the unit block closest to the charge and discharge path is at the same level as at the control section 24, an output from the battery adjustment section 39 is directly input to the control section 24 without passing through the transmission section 27.

As described above, in order to address the above issue of high voltage, an insulated communication section is provided that is insulated from the battery adjustment section and the slave control section for the case of the secondary battery pack illustrated in FIG. 3, and the high voltage-withstanding level conversion circuit or the insulated communication means for the case of the secondary battery pack illustrated in FIG. 4.

However, the general problem is that there is a limitation in terms of withstanding voltage in the high voltage measure that uses a high voltage-withstanding component. That is, as a number of batteries are connected in series, it is necessary for control ICs with level conversion to be connected in cascade; there is a limitation in terms of withstanding voltage for the cascade connection of the control ICs with level conversion. Therefore, the problem is a limited number of control ICs that can be connected. Meanwhile, the problem with the insulation method is that the secondary battery pack generally consumes more power and leads to higher costs. Another problem with the insulation method is that since the amount of power consumed in steady states tends to increase further due to large amounts of leakage and the like, the energy of batteries can be lost inside the battery pack.

The present invention has been made to solve the above problems. The object of the present invention is to provide a secondary battery pack in which a battery adjustment section is provided for each of a plurality of unit blocks that are created by dividing a secondary battery block having a plurality of secondary batteries connected in series and information from the battery adjustment section is used for controlling. The secondary battery pack is equipped with an information transmission and control system that has no limitation in terms of withstanding voltage and consumes less power to operate.

Means for Solving the Problems

To achieve the above object, a secondary battery pack of the present invention includes a secondary battery block in which a plurality of unit blocks each having a plurality of secondary batteries connected in series is connected in series; battery adjustment sections that are each provided for each of the unit blocks, are connected to each secondary battery in the unit blocks, and have a function of monitoring the voltage of the secondary batteries; a charge switch that is used to break a charge path inserted into a charge and discharge path of the secondary battery block; and a discharge switch that is used to break a discharge path inserted into the charge and discharge path. The secondary battery pack includes transmission sections that are each provided for each of the unit blocks, are connected to the battery adjustment sections, and receive information from the battery adjustment sections. The transmission sections are connected to the transmission sections provided for the preceding or subsequent unit blocks, and are so set that at least either information input from the preceding transmission sections or information input from the battery adjustment sections is output to the subsequent transmission sections.

Moreover, a secondary battery pack of the present invention includes a secondary battery block in which connected in series is a plurality of combined blocks in each of which a plurality of unit blocks each having a plurality of secondary batteries connected in series is connected in series; battery adjustment sections that are each provided for each of the unit blocks, are connected to each secondary battery in the unit blocks, and have a function of monitoring the voltage of the secondary batteries; slave control sections that are each provided for each of the combined blocks and have a function of monitoring the voltage of each unit block in the combined blocks; a charge switch that is used to break a charge path inserted into a charge and discharge path of the secondary battery block; and a discharge switch that is used to break a discharge path inserted into the charge and discharge path. The secondary battery pack includes transmission sections that are each provided for each of the combined blocks, are connected to the slave control sections, and receive information from the slave control sections. The transmission sections are connected to the transmission sections provided for the preceding or subsequent combined blocks, and are so set that at least either information input from the preceding transmission sections or information input from the slave control sections is output to the subsequent transmission sections.

Moreover, the transmission sections may be equipped with a constant current transmission function to transmit with a constant value of current and a current detection function to detect the value of the constant current.

Moreover, the transmission section may be equipped with an OR function section that outputs detection information when there is at least detection information from the battery adjustment section of the unit block for which the transmission section is provided, detection information from the preceding transmission section, or detection information from the slave control section of the combined block for which the transmission section is provided.

Moreover, at least either the charge or discharge switch may be controlled by an output from the transmission section provided for the unit block closest to the charge and discharge path.

Moreover, the secondary battery pack may include a current detection section that monitors a charge and discharge current of the secondary battery block. An output from the current detection section may be input to the battery adjustment section provided for the unit block closest to the charge and discharge path, and the battery adjustment section or the transmission section connected to the battery adjustment section may have means for determining whether the output from the current detection section is in an abnormal state.

Advantages of the Invention

As described above, according to the present invention, the information from the battery adjustment section of each unit block or from the slave control section of each combined block is input to the transmission section which then transmits the information to the subsequent transmission section. The information then passes through, one after another, the transmission sections that follow. Thus, the information from the battery adjustment section of each unit block or from the slave control section of each combined block is transmitted to the control section or the charge and discharge switches.

The secondary battery pack may be so formed as to output the output of the transmission section with a constant current having an extremely small value and receive the output at the high-resistance current detection section, thereby enabling input information with a different level of voltage to be transmitted with a constant current.

Moreover, the secondary battery pack may be so set as to output in the form of constant current, sequentially transmit the output, and drive the charge and discharge switches using a current output value thereof, thereby enabling the charge and discharge switches to be directly driven even on the basis of information from the battery adjustment section or slave control section provided for each stage and allowing conducting a driving function as well as the transmission of information.

As described above, what can be realized according to the present invention is a secondary battery pack in which a battery adjustment section is provided for each of a plurality of unit blocks that are created by dividing a secondary battery block having a plurality of secondary batteries connected in series and information from the battery adjustment section is used for controlling. The secondary battery pack is equipped with an information transmission and control system that has no limitation in terms of withstanding voltage and consumes less power to operate.

EXPLANATION OF REFERENCE SYMBOLS

Figure 1:
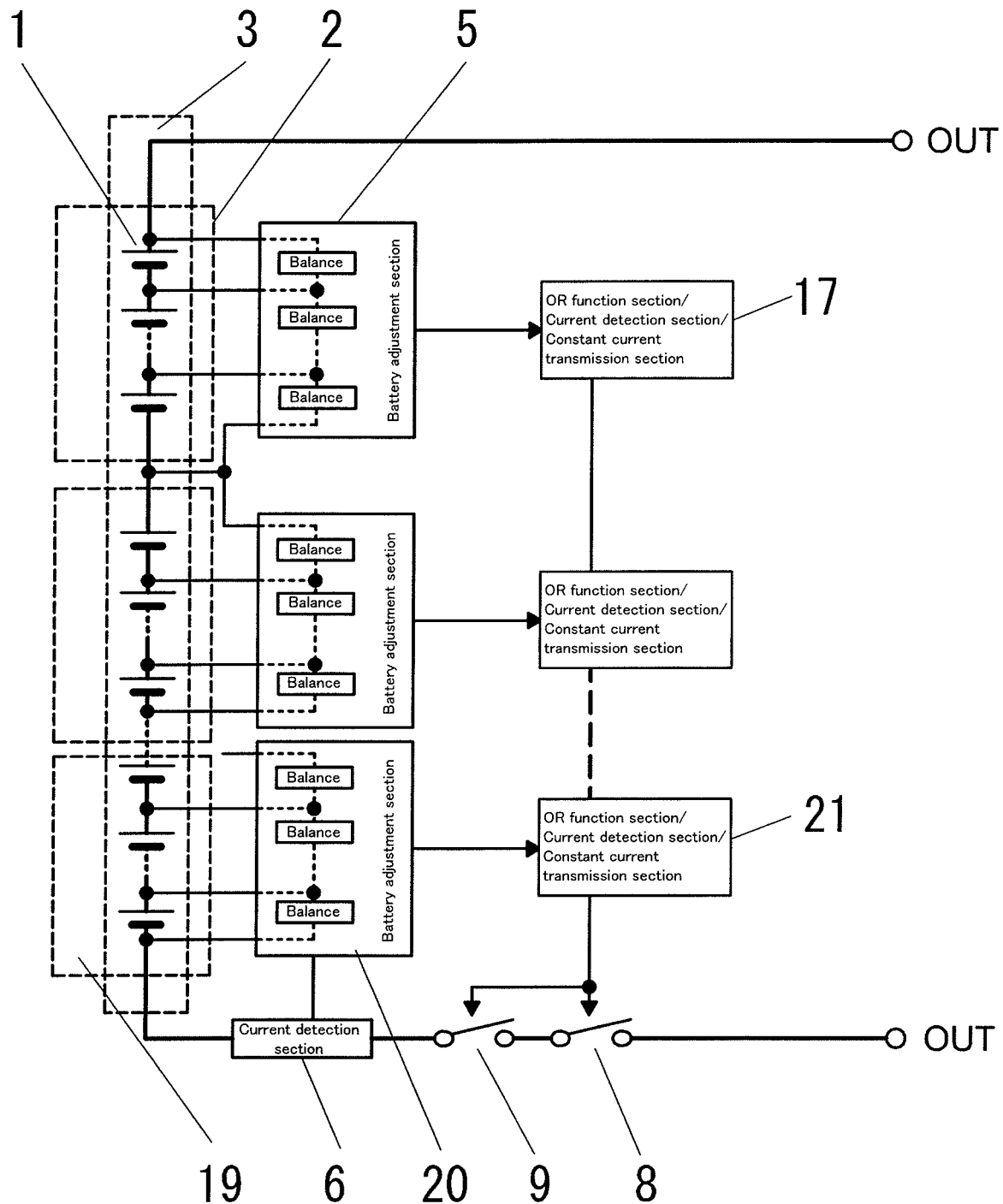
FIG. 1 is a circuit diagram illustrating a secondary battery pack according to an embodiment of the present invention.

1 Secondary battery
2, 19 Unit block
3 Secondary battery block
4 Combined block
5, 20, 25, 39 Battery adjustment section
6 Current detection section
8 Charge switch
9 Discharge switch
10 Temperature detection section
12 Slave control section
14 Master control section
15 Insulated communication section
17, 21, 27 Transmission section
24 Control section
41 High-resistance circuit
42 Voltage detection circuit
43 OR circuit
44 Constant current transmission circuit

BEST MODE FOR CARRYING OUT THE INVENTION

Hereinafter, an embodiment of the present invention will be described in detail with reference to the accompanying drawings.

FIG. 1 is a circuit diagram illustrating a secondary battery pack according to an embodiment of the present invention. In FIG. 1, the secondary battery pack includes a secondary battery block 3 in which a plurality of unit blocks 2 each having a plurality of secondary batteries 1 connected in series is connected in series; battery adjustment sections 5 that are each provided for each of the unit blocks 2 and connected to each secondary battery in the unit blocks 2 and which have a function of monitoring the voltage of the secondary batteries and a function of adjusting the balance of voltage between the secondary batteries; a charge switch 8 that is used to break a charge path inserted into a charge and discharge path of the secondary battery block 3; and a discharge switch 9 that is used to break a discharge path inserted into the charge and discharge path. The secondary battery pack includes transmission sections 17 that are each provided for each of the unit blocks 2, are connected to the battery adjustment sections 5, and receive information from the battery adjustment sections 5. The transmission sections are connected to the transmission sections provided for the preceding or subsequent unit blocks. The transmission sections are so set that at least either information input from the preceding transmission sections or information input from the battery adjustment sections 5 is output to the subsequent transmission sections.

Moreover, the transmission sections 17 are equipped with a constant current transmission section that transmits with a constant value of current; and a current detection section that can detect the value of the constant current.

Furthermore, the charge switch 8 and the discharge switch 9 are so set as to be directly controlled by an output from a transmission section 21 that is provided for a unit block 19, which is a unit block closest to the charge and discharge path, and is connected to a battery adjustment section 20 of the unit block 19.

Moreover, according to the present embodiment, the secondary battery pack includes a current detection section 6 that monitors a charge and discharge current of the secondary battery block 3. An output from the current detection section 6 is input to the battery adjustment section 20 provided for the unit block 19 that is closest to the charge and discharge path. The battery adjustment section 20 includes a means for making a determination as to whether the output from the current detection section 6 is in an abnormal state; the resultant information is transmitted, along with information about the unit block 19, to the transmission section 21.

According to the present embodiment, all the battery adjustment sections include the functions of monitoring the voltage of the secondary batteries inside the unit blocks connected to the battery adjustment sections, adjusting the balance of voltage values of the secondary batteries, making a determination as to whether the unit blocks and the secondary batteries inside the unit blocks are in an abnormal state such as overcharge or over-discharge, and outputting the resultant abnormal information as detection information to the transmission sections connected to the battery adjustment sections.

Figure 2:
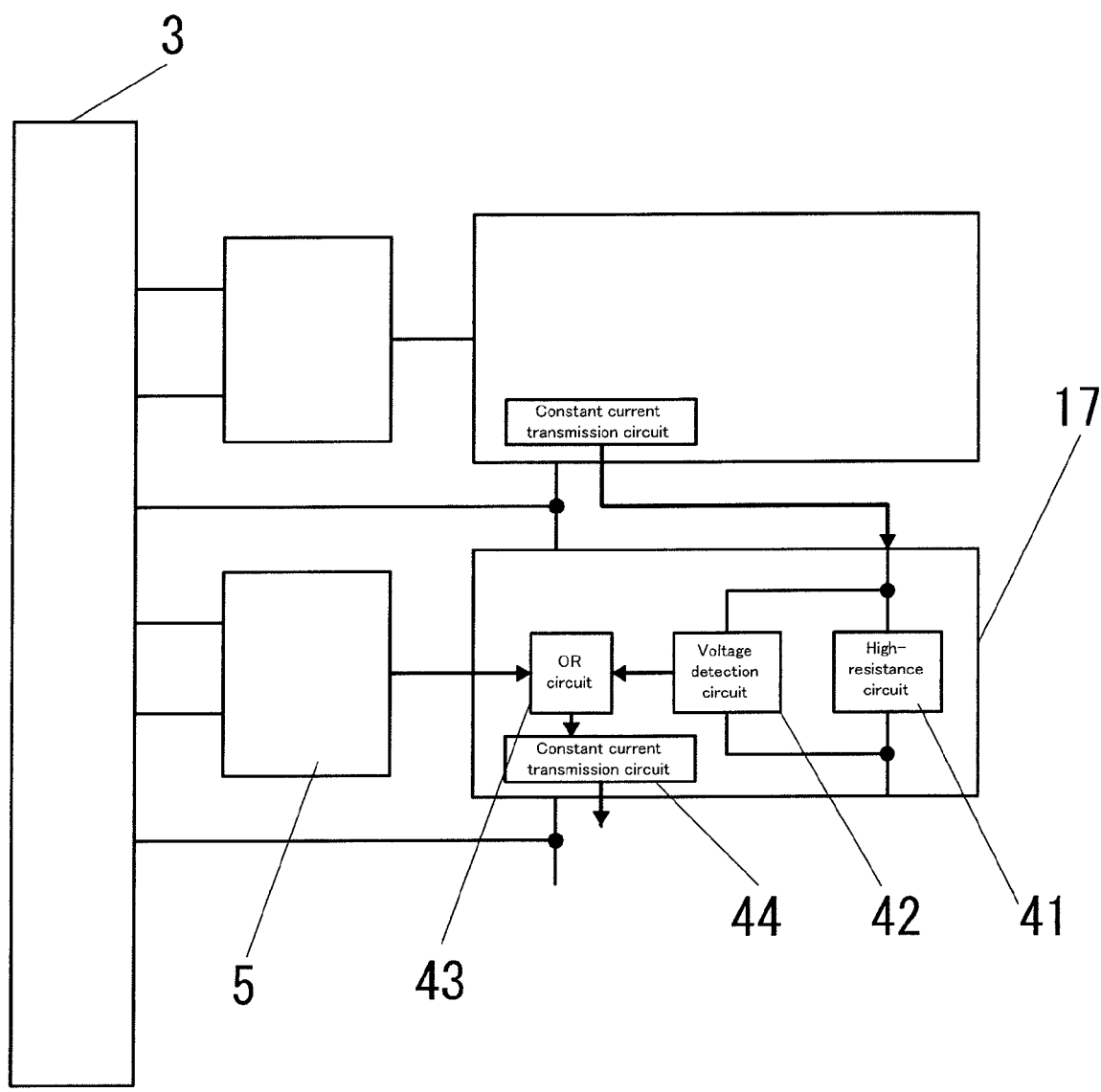
FIG. 2 is a diagram illustrating an example of the specific circuit configuration of a transmission section according to an embodiment of the present invention.

FIG. 2 is a diagram illustrating an example of the specific circuit configuration of the transmission section 17. In FIG. 2, when there is abnormal information from the preceding transmission section, the information is transmitted as a constant current from the constant current transmission circuit of the preceding transmission section and is input to a high-resistance circuit 41. The voltage at both terminals of the high-resistance circuit 41 is detected by a voltage detection circuit 42 and the resultant information is input to an OR circuit 43. The abnormal information from the battery adjustment section 5 is also input to the OR circuit 43. The OR circuit 43 outputs the abnormal information when there is at least either the abnormal information from the battery adjustment section or the abnormal information from the preceding transmission section. The abnormal information is input to a constant current transmission circuit 44 and then is transmitted to the subsequent transmission section as a constant current.

As described above, the abnormal information is sequentially transmitted via the transmission section 17. Moreover, when there is the abnormal information from the battery adjustment section 5, the abnormal information from the battery adjustment section 5 is also transmitted. The abnormal information is input to the last transmission section 21; the charge switch 8 and the discharge switch 9 are controlled.

In that manner, the transmission sections are sequentially connected thanks to the transmission of information by constant current. Accordingly, the potential differences at the boundaries between the transmission sections that are each provided for each unit block become zero. Therefore, the transmission of information is possible without using the insulation method that requires expensive high voltage-withstanding components or higher power consumption. Thus, the transmission of information is possible without causing problems associated with the conventional technique even if the number of secondary batteries or unit blocks connected in series increases.

As described above, what is obtained according to the present invention is a secondary battery pack that is equipped with an information transmission and control system that has no limitation in terms of withstanding voltage and consumes less power to operate.

Figure 3:
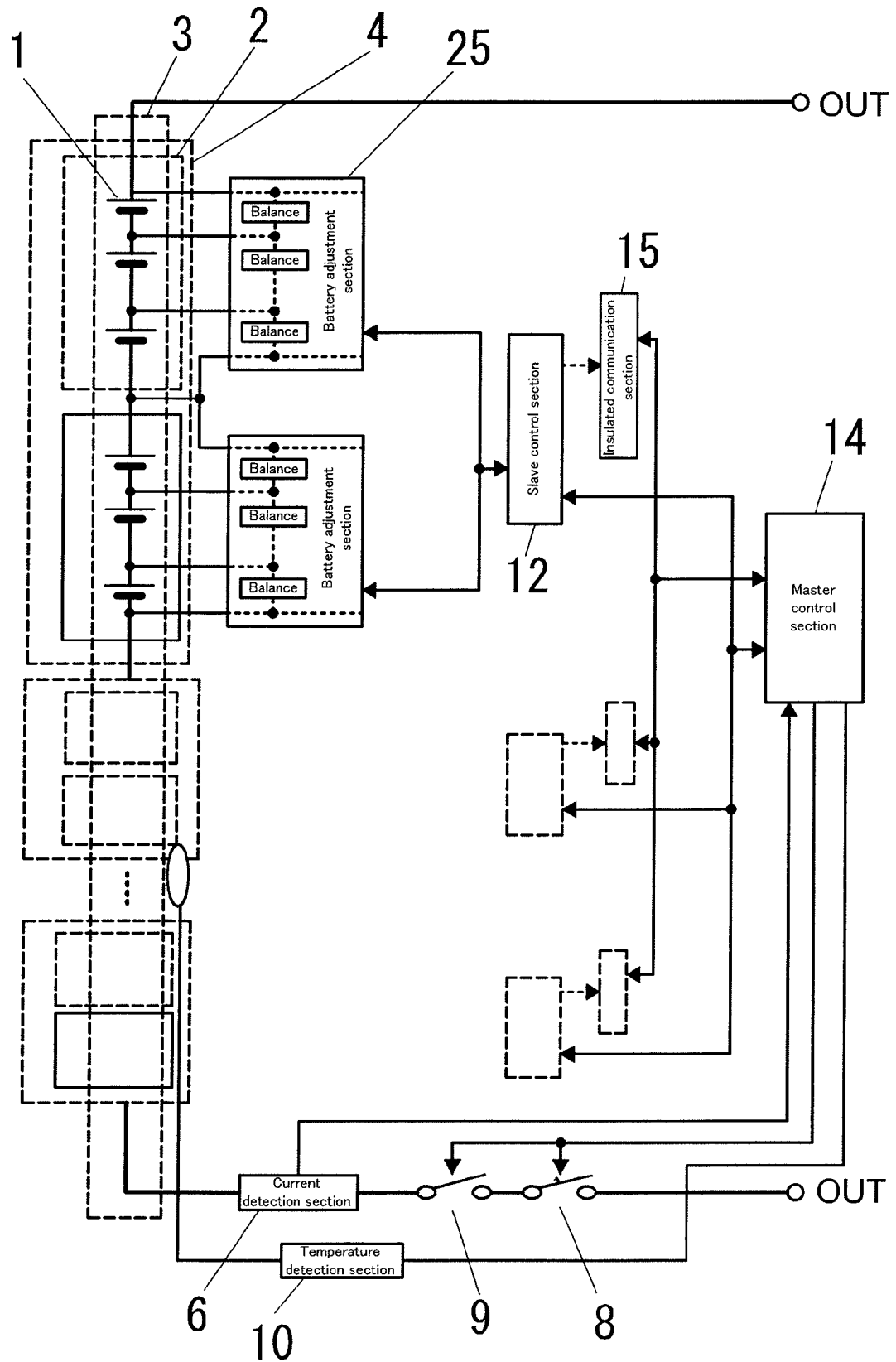
FIG. 3 is a circuit diagram illustrating an example of a battery pack in which a secondary battery block is formed by connecting a number of batteries in series.
Figure 4:
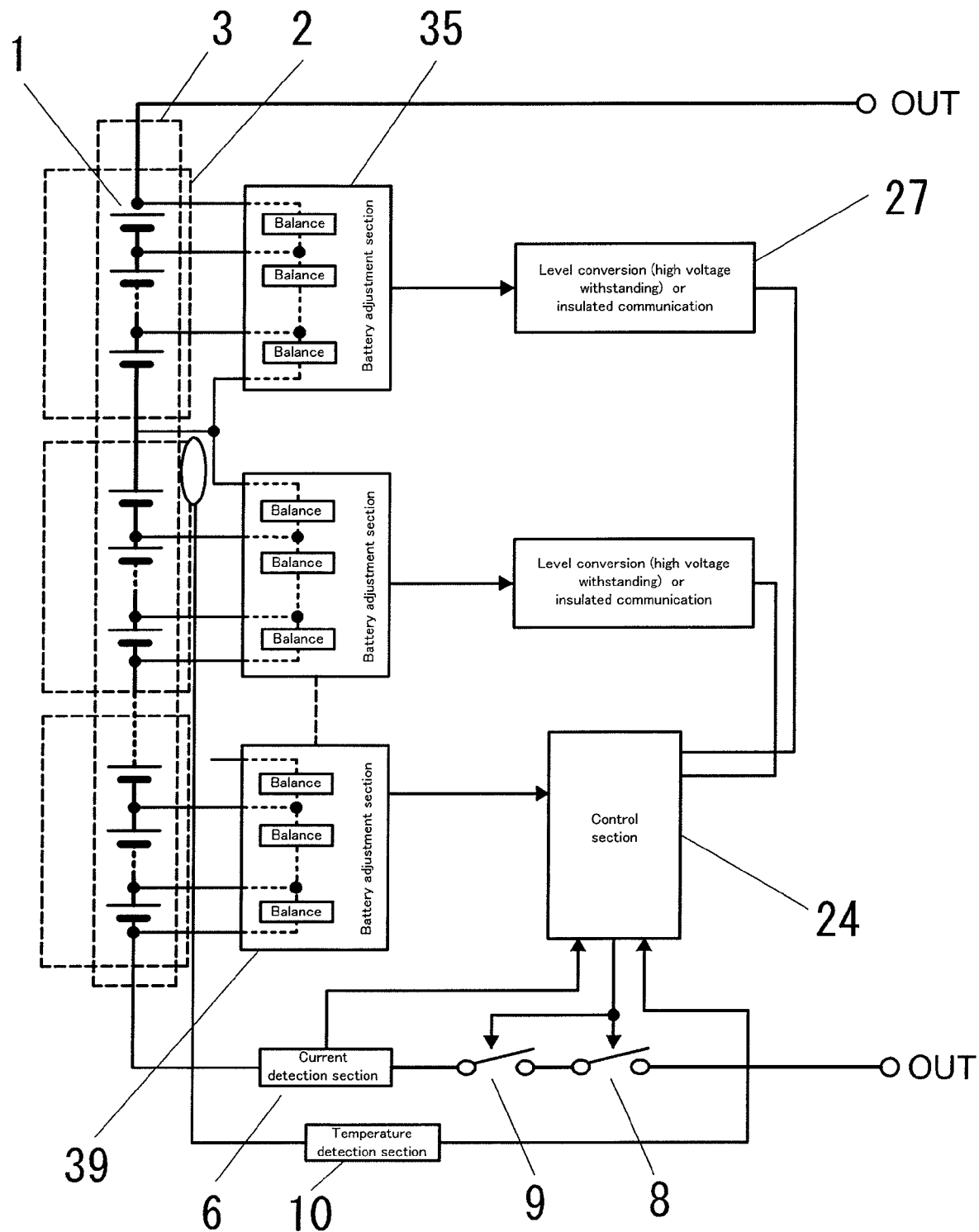
FIG. 4 is a circuit diagram illustrating an example of the configuration of a secondary battery pack having a simplified configuration.

Incidentally, needless to say, the present invention is not limited to the above embodiment. The design may be subject to change depending on how the secondary battery pack is used or what the secondary battery pack is used for. For example, instead of providing the transmission sections directly connected to the battery adjustment sections, slave control sections may be provided to perform the adjustment and control process for each of combined blocks which each include several unit-block battery adjustment sections as shown in FIG. 3; also provided in this case are the transmission sections connected to the slave control sections in order to transmit information from the slave control sections. Moreover, even if the signals, such as abnormal information, output from the transmission sections are not in the form of constant current, the object of the present invention can be achieved as long as the signals have an extremely small value of current. Moreover, it is not necessarily one kind of signal that is transmitted between the transmission sections. It is possible to transmit a plurality of kinds of information using a plurality of connection lines and the like. The charge switch and the discharge switch may not be directly driven by the last transmission section. The switches may be driven by a driving control section connected to the last transmission section. The information to be transmitted may not pass through all the transmission sections provided for the unit blocks that constitute the secondary battery block; control information may be output after information is transmitted within each combined block that includes several unit blocks. Moreover, a voltage monitoring function is indispensable for the battery adjustment sections and the slave control sections. However, the battery adjustment sections and the slave control sections may not have a voltage balance adjustment function. Even in such a case, the present invention can be applied.

INDUSTRIAL APPLICABILITY

The present invention relates to a secondary battery pack such as lithium-ion battery, the use of which has become widespread in recent years into such fields as electrically-powered equipment and storage of electricity. Such a secondary battery pack is formed by connecting a plurality of single batteries in series. According to the conventional technique, the potential differences between the unit blocks increase when the circuits that transmit information from the battery adjustment sections are disposed. Accordingly, high voltage could be applied in the system that transmits signals to the control circuit; high voltage-withstanding components are therefore required for circuit components or detection elements connected to the system. Or alternatively, particular kinds of insulation are necessary for the signal transmission system. According to the present invention, what can be realized is a secondary battery pack in which a battery adjustment section is provided for each of a plurality of unit blocks that are created by dividing a secondary battery block having a plurality of secondary batteries connected in series and information from the battery adjustment section is used for controlling. The secondary battery pack is equipped with an information transmission and control system that has no limitation in terms of withstanding voltage and consumes less power to operate. Thus, the secondary battery pack is extremely useful for industrial purposes.

The invention claimed is:

1. A secondary battery pack, comprising:
a secondary battery block in which a plurality of unit blocks each having a plurality of secondary batteries connected in series is connected in series;
battery adjustment sections that are each provided for each of the unit blocks, are connected to each secondary battery in the unit blocks, and have a function of monitoring the voltage of the secondary batteries;
a charge switch that is used to break a charge path inserted into a charge and discharge path of the secondary battery block;
a discharge switch that is used to break a discharge path inserted into the charge and discharge path;
a current detection section that monitors a charge and discharge current of the secondary battery block;
and transmission sections that are each provided for each of the unit blocks, are connected to the battery adjustment sections, and receive information from the battery adjustment sections, wherein
the current detection section is on the low voltage side of the secondary battery block and is electrically located between the unit block and the charge switch/discharge switch at the charge and discharge path,
an output from the current detection section is input to the battery adjustment section or slave control section provided for the unit or combined block closest to the charge and discharge path, and the battery adjustment section, the slave control section, or the transmission section connected to the battery adjustment section or slave control section has means for determining whether the output from the current detection section is in an abnormal state,
the transmission sections are connected to the transmission sections provided for the preceding or subsequent unit blocks, and are so set that at least either information input from the preceding transmission sections or information input from the battery adjustment sections is output to the subsequent transmission sections, and
the charge switch and the discharge switch are so set as to be directly controlled by an output from a transmission section that is provided for a unit block electrically closest to the charge and discharge path.

2. A secondary battery pack, comprising:
a secondary battery block in which connected in series is a plurality of combined blocks in each of which a plurality of unit blocks each having a plurality of secondary batteries connected in series is connected in series;
battery adjustment sections that are each provided for each of the unit blocks, are connected to each secondary battery in the unit blocks, and have a function of monitoring the voltage of the secondary batteries;
slave control sections that are each provided for each of the combined blocks and have a function of monitoring the voltage of each unit block in the combined blocks;
a charge switch that is used to break a charge path inserted into a charge and discharge path of the secondary battery block;

a discharge switch that is used to break a discharge path inserted into the charge and discharge path;

a current detection section that monitors a charge and discharge current of the secondary battery block and is electrically located between the unit block and the charge switch/discharge switch at the charge and discharge path;

and transmission sections that are each provided for each of the combined blocks, are connected to the slave control sections, and receive information from the slave control sections, wherein the current detection section is on the low voltage side of the secondary battery block, an output from the current detection section is input to the battery adjustment section or slave control section provided for the unit or combined block closest to the charge and discharge path, and the battery adjustment section, the slave control section, or the transmission section connected to the battery adjustment section or slave control section has means for determining whether the output from the current detection section is in an abnormal state, the transmission sections are connected to the transmission sections provided for the preceding or subsequent combined blocks, and are so set that at least either information input from the preceding transmission sections or information input from the slave control sections is output to the subsequent transmission sections, and the charge switch and the discharge switch are so set as to be directly controlled by an output from a transmission section that is provided for a unit block electrically closest to the charge and discharge path.

3. The secondary battery pack according to any one of claim 1 and claim 2, wherein
the transmission sections are equipped with a constant current transmission function to transmit with a constant value of current and a current detection function to detect the value of the constant current.

4. The secondary battery pack according to any one of claim 1 and claim 2, wherein
the transmission sections are equipped with an OR function section that outputs detection information when there is detection information to be input to the transmission sections.

5. The secondary battery pack according to any one of claim 1 and claim 2, wherein
at least either the charge or discharge switch is controlled by an output from the transmission section provided for the unit or combined block closest to the charge and discharge path.

* * * * *